United States Patent
Arvidson et al.

(10) Patent No.: US 10,607,589 B2
(45) Date of Patent: Mar. 31, 2020

(54) NONWOVEN COMPOSITE

(71) Applicant: Milliken & Company, Spartanburg, SC (US)

(72) Inventors: Sara A. Arvidson, Simpsonville, SC (US); Ryan W. Johnson, Moore, SC (US); Randolph S. Kohlman, Boiling Springs, SC (US); Patrick A. Petri, Greer, SC (US)

(73) Assignee: Milliken & Company, Spartanburg, SC (US)

( * ) Notice: Subject to any disclaimer, the term of this patent is extended or adjusted under 35 U.S.C. 154(b) by 61 days.

(21) Appl. No.: 15/363,691

(22) Filed: Nov. 29, 2016

(65) Prior Publication Data

US 2018/0151167 A1    May 31, 2018

(51) Int. Cl.
   *B32B 3/30* (2006.01)
   *G10K 11/168* (2006.01)
   (Continued)

(52) U.S. Cl.
   CPC ............ *G10K 11/168* (2013.01); *B32B 3/263* (2013.01); *B32B 3/28* (2013.01); *B32B 3/30* (2013.01);
   (Continued)

(58) Field of Classification Search
   CPC .. B32B 3/26; B32B 3/263; B32B 3/30; B32B 5/02; B32B 5/022; B32B 5/024;
   (Continued)

(56) References Cited

U.S. PATENT DOCUMENTS 3,214,565 A    10/1965  Hager, Jr. et al.
3,591,401 A     7/1971  Snyder et al. ............ 117/9
(Continued)

FOREIGN PATENT DOCUMENTS

AU        736304        2/1999  ............ D06M 23/16
DE   202005015164        1/2006  ............ B62D 25/16
(Continued)

OTHER PUBLICATIONS

Patent Cooperation Treaty PCT International Search Report, dated, Dec. 12, 2017. International Application No. PCT/US2017/051725. International Filing Date: Sep. 15, 2017.
(Continued)

*Primary Examiner* — Megha M Gaitonde
(74) *Attorney, Agent, or Firm* — Cheryl J. Brickey

(57) ABSTRACT

The application relates to a nonwoven composite containing a lofty nonwoven layer and a film. The lofty nonwoven layer contains a plurality of primary fibers and defines a plurality of peak regions and a plurality of valley regions. The film contains a thermoplastic polymer and has a peak film thickness in the peak regions of the layer. The film is present on at least a majority of the second surface of the nonwoven layer. Within the valley regions, the film encapsulates a plurality of fibers from the nonwoven layer. The cross-sectional area fraction of total fibers in the film within the valley regions is at least about 8% and the cross-sectional area fraction of total fibers in the film within the peak regions is less than about 5%.

25 Claims, 6 Drawing Sheets

(51) Int. Cl.
*B32B 3/28* (2006.01)
*B32B 7/04* (2019.01)
*B60R 13/08* (2006.01)
*B32B 5/14* (2006.01)
*B32B 7/05* (2019.01)
*B32B 3/26* (2006.01)
*B32B 5/02* (2006.01)
*B32B 27/12* (2006.01)
*B32B 27/32* (2006.01)
*B32B 27/36* (2006.01)
*D04H 1/72* (2012.01)

(52) U.S. Cl.
CPC .............. *B32B 5/022* (2013.01); *B32B 5/145* (2013.01); *B32B 7/04* (2013.01); *B32B 7/05* (2019.01); *B32B 27/12* (2013.01); *B32B 27/32* (2013.01); *B32B 27/36* (2013.01); *B60R 13/0815* (2013.01); *D04H 1/72* (2013.01); *B32B 2262/00* (2013.01); *B32B 2262/0284* (2013.01); *B32B 2307/102* (2013.01); *B32B 2307/72* (2013.01); *B32B 2605/00* (2013.01); *B32B 2605/08* (2013.01)

(58) Field of Classification Search
CPC .... B32B 5/06; B32B 5/12; B32B 5/14; B32B 5/142; B32B 5/145; B32B 5/22; B32B 5/24; B32B 5/26; Y10T 428/24025; Y10T 428/24132; Y10T 428/24355; Y10T 428/24479; Y10T 428/2457; Y10T 428/24612; Y10T 428/24942; Y10T 428/2495; Y10T 428/23907; Y10T 428/23929; Y10T 428/23936; Y10T 428/2395; Y10T 428/23957; Y10T 428/23979; Y10T 428/23986; Y10T 428/23993
USPC ....... 428/101, 114, 141, 147, 156, 159, 163, 428/167, 171, 172, 212, 213, 85, 88, 89, 428/91, 92, 95, 96, 97
See application file for complete search history.

(56) References Cited

U.S. PATENT DOCUMENTS

| | | | |
|---|---|---|---|
| 3,654,063 A | 4/1972 | Blackburn et al. | 161/125 |
| 3,870,557 A | 3/1975 | Fink et al. | 117/161 R |
| 3,899,192 A | 8/1975 | Reddaway | 280/154.5 R |
| 4,082,878 A | 4/1978 | Boe et al. | 428/195 |
| 4,083,913 A | 4/1978 | Marshall | 264/121 |
| 4,097,633 A | 6/1978 | Focht | 428/138 |
| 4,152,474 A | 5/1979 | Cook et al. | 428/137 |
| 4,251,581 A | 2/1981 | Schoppa et al. | 428/95 |
| 4,451,315 A | 5/1984 | Miyazaki | 156/220 |
| 4,472,461 A | 9/1984 | Johnson | 427/208.6 |
| 4,487,793 A | 12/1984 | Haines, Jr. et al. | 428/136 |
| 4,735,427 A | 4/1988 | Fuchs | 280/152 R |
| 4,755,416 A | 7/1988 | Schneider et al. | 428/167 |
| 4,908,176 A | 3/1990 | Kato | 264/122 |
| 4,921,753 A | 5/1990 | Harrison | 428/251 |
| 5,019,194 A * | 5/1991 | Friedrich | D06N 7/0086 156/61 |
| 5,082,712 A * | 1/1992 | Starp | E04F 15/10 428/174 |
| 5,108,826 A | 4/1992 | Fujiki | 428/212 |
| 5,186,996 A | 2/1993 | Alts | 428/72 |
| 5,216,790 A | 6/1993 | Eschenback | 28/112 |
| 5,459,291 A | 10/1995 | Haines et al. | 181/286 |
| 5,462,331 A | 10/1995 | Stief et al. | 296/198 |
| 5,681,072 A | 10/1997 | Stricker | 296/39.3 |
| 5,876,551 A | 3/1999 | Jackson | 156/307.4 |
| 6,086,104 A | 7/2000 | Marchisio et al. | 280/851 |
| 6,345,688 B1 | 2/2002 | Veen et al. | 181/290 |
| 6,443,257 B1 | 9/2002 | Wiker et al. | 181/290 |
| 6,514,889 B1 | 2/2003 | Theoret et al. | 442/320 |
| 6,598,701 B1 | 7/2003 | Wood et al. | 181/290 |
| 6,617,002 B2 | 9/2003 | Wood | 428/131 |
| 6,641,194 B2 | 11/2003 | Fujii et al. | 296/39.3 |
| 6,648,100 B2 | 11/2003 | Ebbitt | 181/293 |
| 6,676,199 B2 | 1/2004 | Buisson et al. | 296/193.07 |
| 6,720,058 B1 * | 4/2004 | Weeks | B29C 65/086 428/94 |
| 6,720,068 B1 | 4/2004 | Vanbemmel et al. | 428/317.9 |
| 6,726,980 B2 | 4/2004 | Staelgraeve et al. | 428/192 |
| 6,953,205 B2 | 10/2005 | Friest et al. | 280/770 |
| 7,080,712 B2 | 7/2006 | Tsuiki et al. | 181/204 |
| 7,137,477 B2 | 11/2006 | Keller et al. | 181/286 |
| 7,157,137 B2 | 1/2007 | Wenstrup | 428/218 |
| 7,226,656 B2 | 6/2007 | Coates et al. | 428/221 |
| 7,341,963 B2 | 3/2008 | Wenstrup | 442/415 |
| 7,393,371 B2 | 7/2008 | O'Gary et al. | 51/297 |
| 7,428,803 B2 | 9/2008 | Wenstrup et al. | 52/506.07 |
| 7,448,468 B2 | 11/2008 | Czerny et al. | 181/210 |
| 7,491,438 B2 | 2/2009 | Demott et al. | 428/95 |
| 7,497,509 B2 | 3/2009 | Omiya et al. | 296/198 |
| 7,501,362 B2 | 3/2009 | Maier | 442/394 |
| 7,521,386 B2 | 4/2009 | Wenstrup et al. | 442/389 |
| 7,563,498 B2 | 7/2009 | Shimizu et al. | 428/95 |
| 7,677,358 B2 | 3/2010 | Tocchi et al. | 181/290 |
| 7,690,480 B2 | 4/2010 | Mori et al. | 181/290 |
| 7,694,779 B2 | 4/2010 | Takayasu et al. | 181/294 |
| 7,696,112 B2 | 4/2010 | Wenstrup et al. | 442/415 |
| 7,700,176 B2 | 4/2010 | Allison et al. | 428/95 |
| 7,709,405 B2 | 5/2010 | Wenstrup | 442/415 |
| 7,731,878 B2 | 6/2010 | Wood | 264/156 |
| 7,799,708 B2 | 9/2010 | Francis et al. | 442/76 |
| 7,837,009 B2 | 11/2010 | Gross et al. | 181/290 |
| 7,846,282 B2 | 12/2010 | Nishio et al. | 156/78 |
| 7,878,301 B2 | 2/2011 | Gross et al. | 181/290 |
| 7,918,313 B2 | 4/2011 | Gross et al. | 181/294 |
| 7,928,025 B2 | 4/2011 | Shipley et al. | 442/383 |
| 7,998,890 B2 | 8/2011 | Flack | 442/411 |
| 8,091,684 B2 | 1/2012 | Juriga | 181/286 |
| 8,167,335 B2 | 5/2012 | Takeuchi | 280/851 |
| 8,278,228 B2 | 10/2012 | Kaneda | 442/417 |
| 8,322,487 B1 | 12/2012 | Kitchen et al. | 181/294 |
| 8,403,108 B2 | 3/2013 | Bliton et al. | 181/294 |
| 8,418,806 B1 | 4/2013 | Wyerman et al. | 181/290 |
| 8,439,161 B2 | 5/2013 | Bliton et al. | 181/290 |
| 8,496,088 B2 | 7/2013 | Kitchen et al. | 181/290 |
| 8,556,297 B2 | 10/2013 | Uehara et al. | 280/851 |
| 8,590,669 B2 | 11/2013 | Wyerman et al. | 181/290 |
| 8,598,052 B2 | 12/2013 | Suzuki et al. | 442/79 |
| 8,607,929 B2 | 12/2013 | Bliton et al. | 181/294 |
| 8,695,757 B2 | 4/2014 | Duval et al. | 181/290 |
| 8,973,981 B2 | 3/2015 | Vaughn, Jr. | 296/198 |
| 9,005,733 B2 | 4/2015 | Fereshtehkhou et al. | 428/141 |
| 9,133,615 B2 | 9/2015 | Bischoff et al. | 181/290 |
| 9,428,121 B2 | 8/2016 | Vaughn, Jr. | 296/198 |
| 9,447,577 B2 | 9/2016 | Kang et al. | 181/284 |
| 9,533,630 B2 | 1/2017 | Foss et al. | 181/290 |
| 9,747,883 B2 | 8/2017 | Demo et al. | 181/290 |
| 9,805,708 B2 | 10/2017 | Kim | |
| 9,849,602 B2 | 12/2017 | Cree | |
| 9,855,902 B2 | 1/2018 | Kim et al. | |
| 9,922,634 B2 | 3/2018 | Thompson, Jr. et al. | |
| 9,982,375 B2 | 5/2018 | Yoshida et al. | |
| 10,081,396 B2 | 9/2018 | Baudry et al. | |
| 2003/0096079 A1 | 5/2003 | Messina et al. | 428/85 |
| 2003/0099810 A1 * | 5/2003 | Allison | B32B 27/12 428/95 |
| 2003/0220034 A1 | 11/2003 | Ochs | 442/76 |
| 2004/0248490 A1 | 12/2004 | Hyuga et al. | 442/327 |
| 2005/0064779 A1 | 3/2005 | Allison et al. | 442/181 |
| 2006/0137799 A1 | 6/2006 | Haque et al. | 156/62.2 |
| 2007/0137926 A1 | 6/2007 | Albin, Jr. et al. | 181/290 |
| 2007/0187940 A1 | 8/2007 | Presby | 280/848 |
| 2007/0190876 A1 | 8/2007 | Ogawa et al. | 442/136 |
| 2008/0014408 A1 | 1/2008 | Muth et al. | 428/137 |
| 2008/0203751 A1 | 8/2008 | Wildhaber | 296/39.3 |
| 2008/0274274 A1 | 11/2008 | Coates et al. | 427/180 |

(56) References Cited

U.S. PATENT DOCUMENTS

| | | | |
|---|---|---|---|
| 2008/0276837 A1 | 11/2008 | Bhamidipati | 106/287.35 |
| 2009/0186724 A1* | 7/2009 | Ashida | A63B 41/08 |
| | | | 473/607 |
| 2009/0256345 A1 | 10/2009 | Tanaka et al. | 280/850 |
| 2010/0003466 A1 | 1/2010 | Hessler | 428/175 |
| 2010/0112881 A1 | 5/2010 | Bahukudumbi | 442/1 |
| 2011/0223388 A1 | 9/2011 | Stone et al. | 428/172 |
| 2012/0207957 A1 | 8/2012 | Michiels et al. | 428/36.1 |
| 2014/0000980 A1 | 1/2014 | Carson et al. | 181/290 |
| 2014/0070562 A1 | 3/2014 | Inagaki | 296/180.1 |
| 2014/0272209 A1 | 9/2014 | Baker et al. | 428/34.1 |
| 2015/0034414 A1 | 2/2015 | Arata et al. | 181/290 |
| 2015/0232044 A1 | 8/2015 | Demo et al. | |
| 2016/0121578 A1 | 5/2016 | Foss et al. | |
| 2016/0121814 A1 | 5/2016 | Foss et al. | |
| 2016/0130747 A1 | 5/2016 | Hannison | |
| 2017/0044699 A1 | 2/2017 | Kurashima et al. | |
| 2017/0120555 A1 | 5/2017 | Sparks et al. | |
| 2017/0165943 A1 | 6/2017 | Kim et al. | |
| 2017/0306538 A1 | 10/2017 | Lee | |
| 2017/0341271 A1 | 11/2017 | Vogt et al. | |
| 2018/0009398 A1 | 1/2018 | Onishi et al. | |
| 2018/0251924 A1 | 9/2018 | Medeiros et al. | |
| 2018/0315411 A1 | 11/2018 | Lake | |

FOREIGN PATENT DOCUMENTS

| | | | |
|---|---|---|---|
| EP | 2428433 | 1/2015 | B62D 25/18 |
| EP | 2939881 | 4/2015 | B60R 13/08 |
| EP | 3 015 583 | 5/2016 | |
| GB | 1380613 | 1/1975 | D04H 1/70 |
| JP | 2000264255 | 9/2000 | B62D 25/18 |
| JP | 3568936 | 6/2004 | G10K 11/162 |
| JP | 3675359 | 5/2005 | B60R 13/08 |
| JP | 3941745 | 4/2007 | B62D 25/18 |
| JP | 3945371 | 4/2007 | B62D 25/18 |
| WO | WO2018083079 | 5/2018 | B62D 25/16 |

OTHER PUBLICATIONS

Patent Cooperation Treaty PCT International Search Report, dated Dec. 8, 2017. International Application No. PCT/US2017/052683. International Filing Date: Sep. 12, 2017.

* cited by examiner

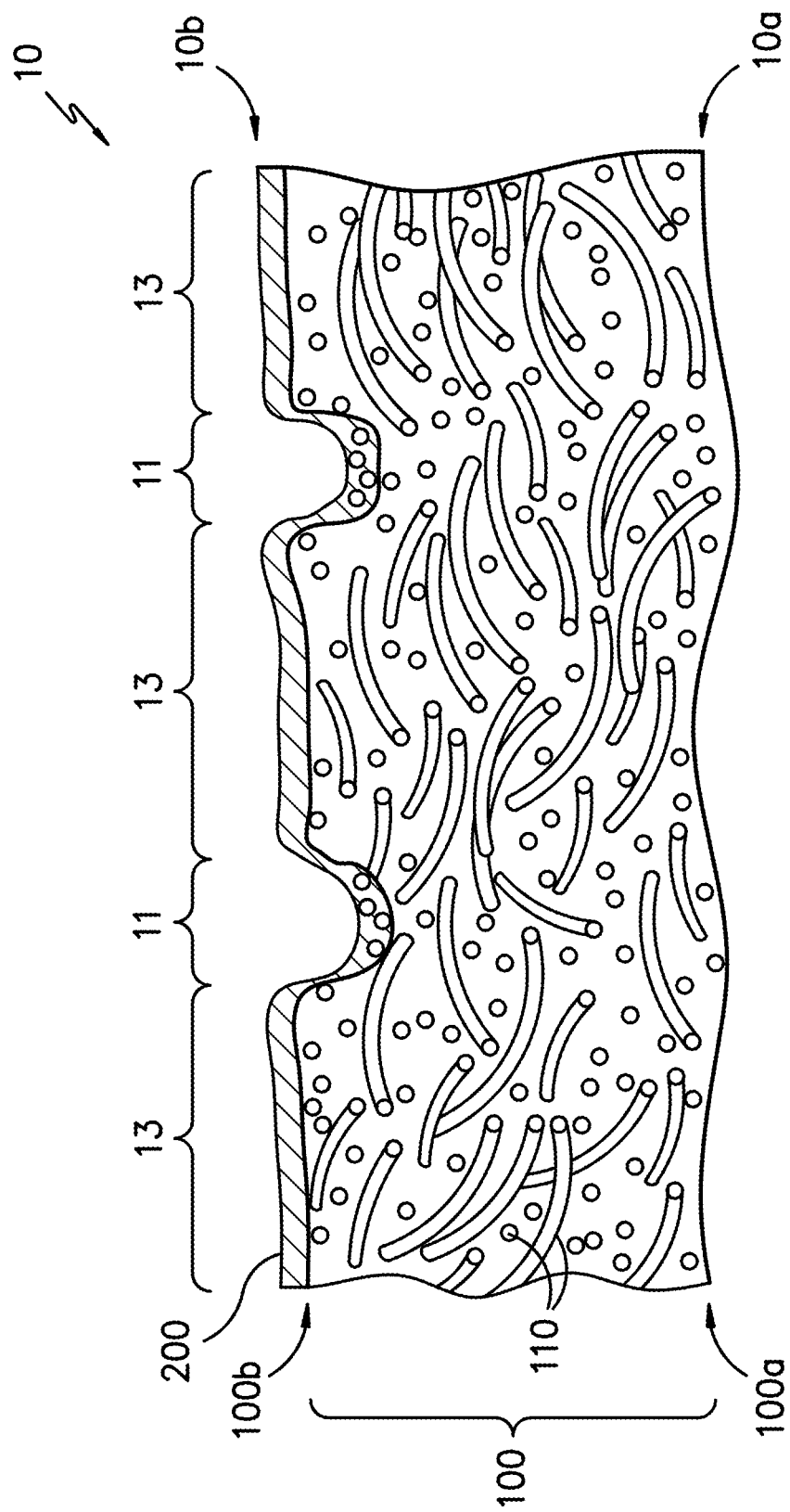
FIG. -1-

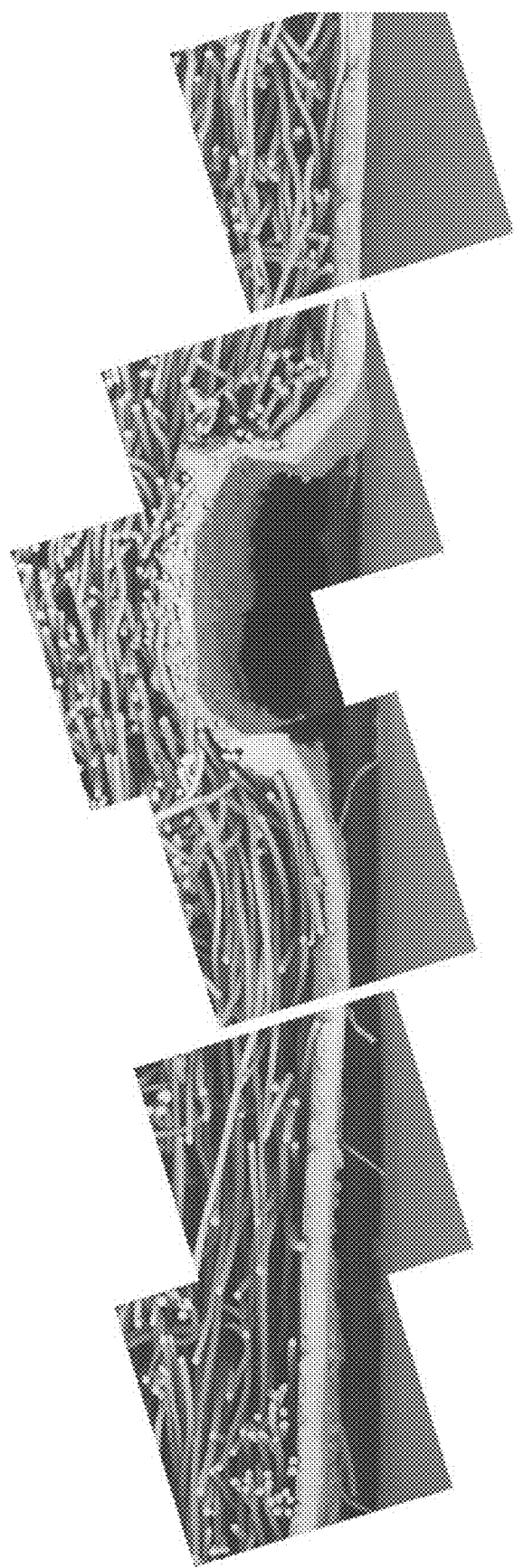
FIG. -2-

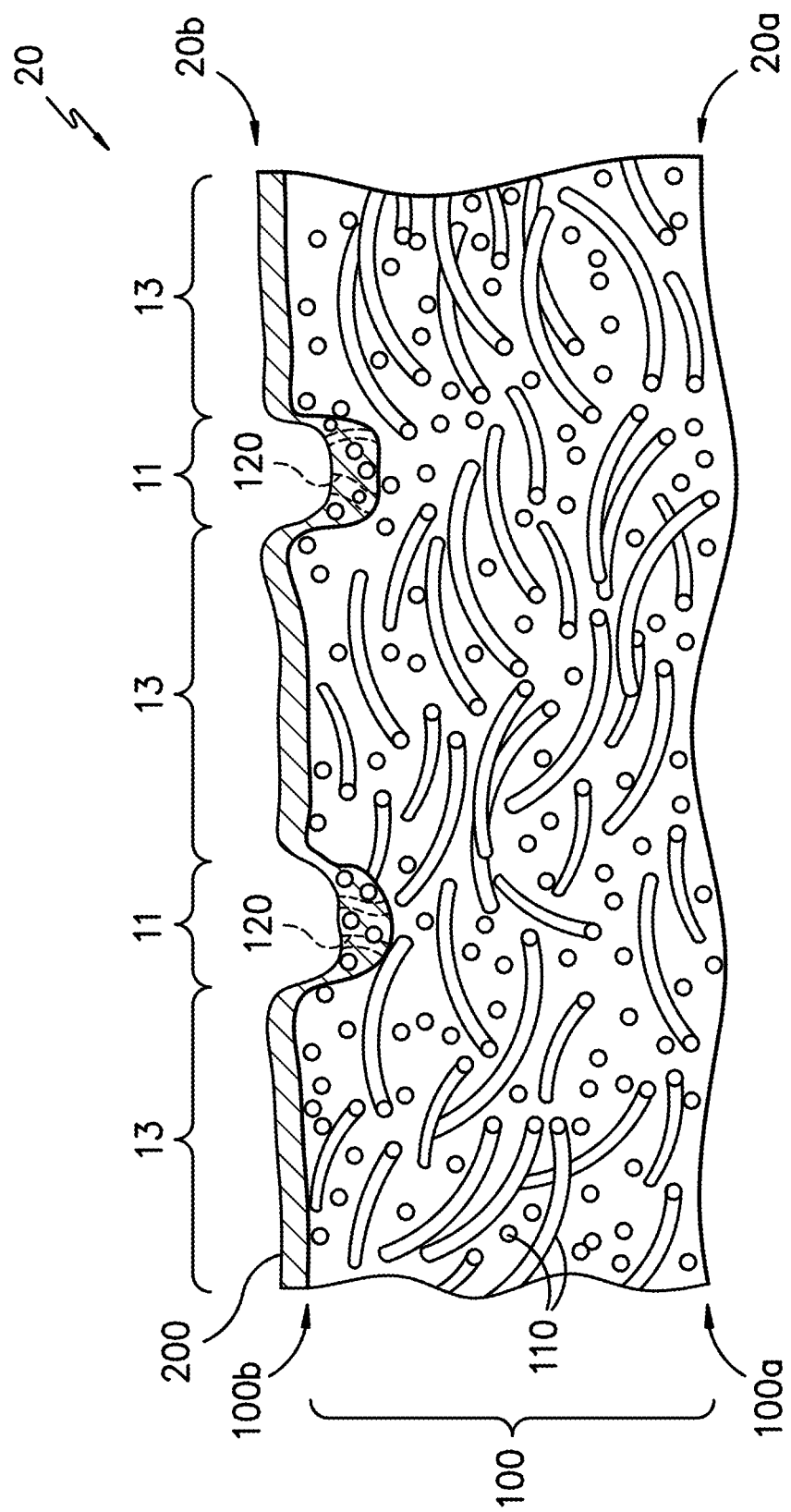
FIG. -3-

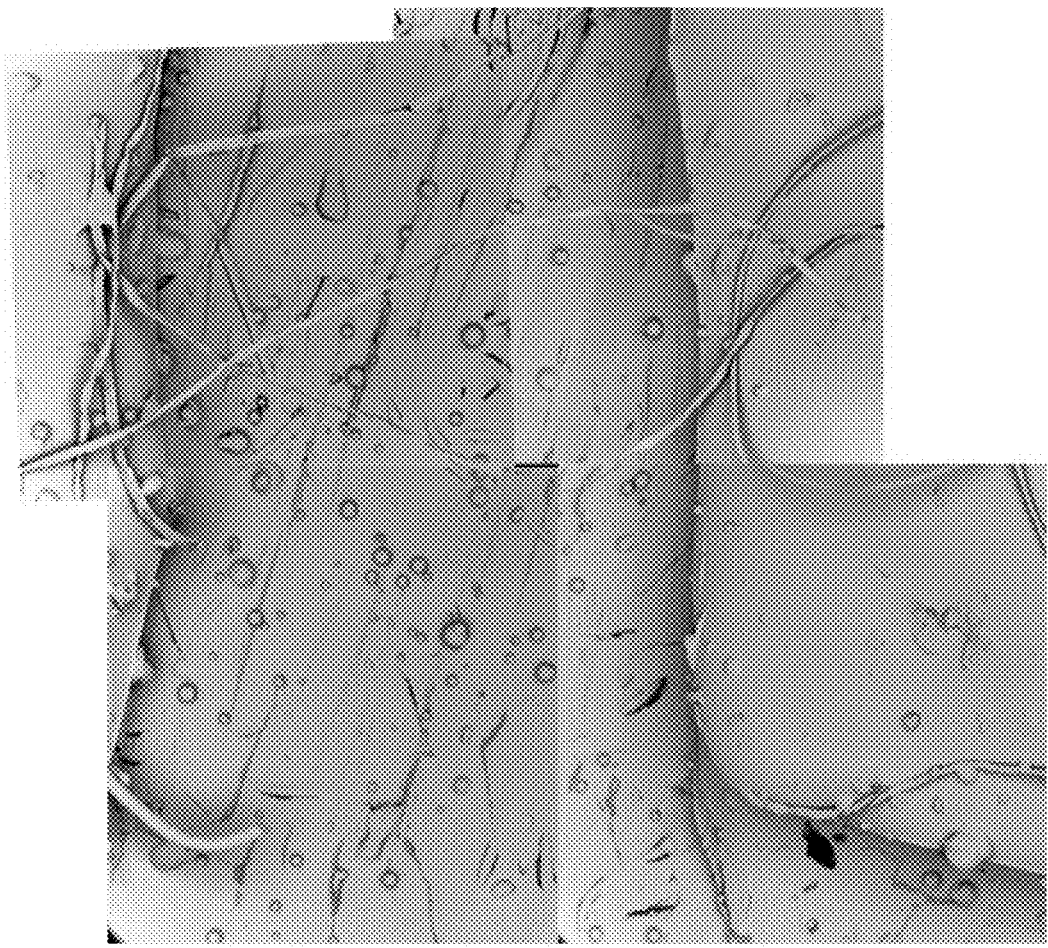
FIG. -4A-

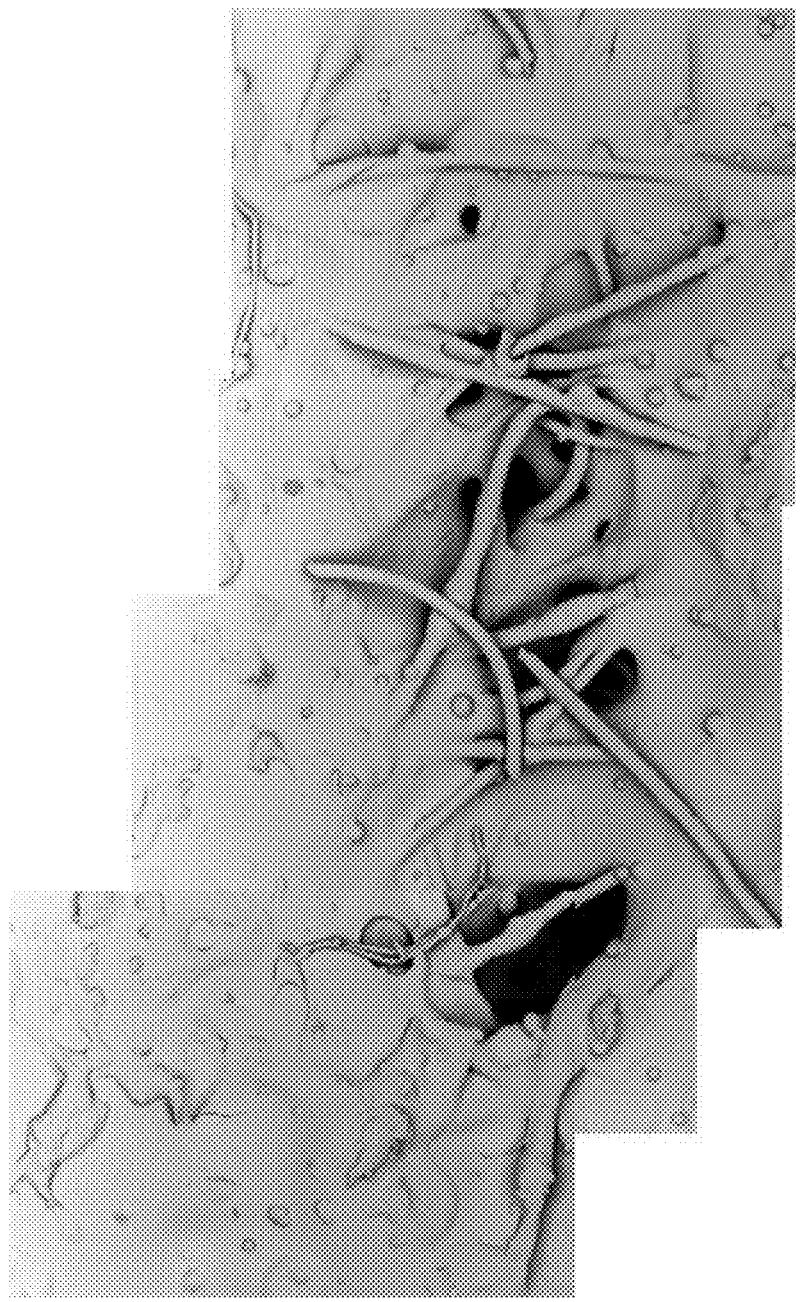
FIG. -4B-

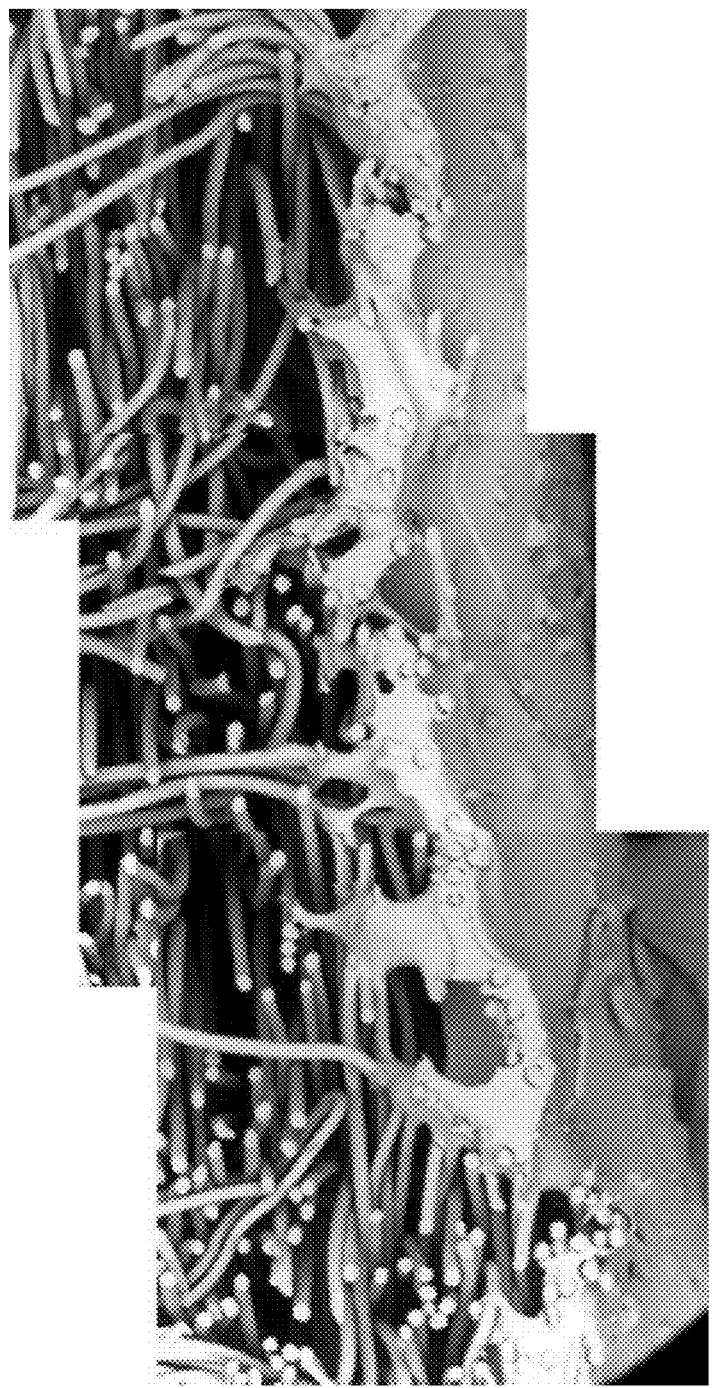
FIG. -5-

NONWOVEN COMPOSITE

FIELD OF THE INVENTION

The present invention generally relates to composites having sound absorbing properties and methods of making and using such composites.

BACKGROUND

Sound absorbing materials are used in a number of applications within the transportation, building and construction, office and home furnishing, and entertainment industries to enhance user experiences and reduce unwanted noise. Composite materials offer the opportunity to tune the acoustic properties of sound absorbing materials for optimal performance in specific applications while minimizing the overall part mass. In many of these applications it is also required that the material be molded into a specified shape and rigidity. In the automotive industry, these types of moldable acoustic composite materials are often used for applications such as wheel well liners, underbody shields, hood liners, firewall barriers, dash insulators, and flooring among others. In certain automotive applications, these moldable acoustic composite materials may require an aesthetically pleasing cover material be incorporated into the part.

There is a need for moldable acoustic nonwoven composite materials having improved and tailored acoustic properties, while retaining low material and manufacturing costs.

BRIEF SUMMARY

The application relates to a nonwoven composite containing a lofty nonwoven layer and a film. The lofty nonwoven layer contains a plurality of primary fibers and has a first side and an opposite second side. The second side defines a plurality of peak regions and a plurality of valley regions. The first side and the second side further define a nonwoven layer thickness. The film contains a thermoplastic polymer and has a peak film thickness in the peak regions of the layer. The film is present on at least a majority of the second side of the nonwoven layer. Within the valley regions, the film contains a plurality of encapsulated fibers from the nonwoven layer. The cross-sectional area fraction of total fibers in the film within the valley regions is at least about 8% and the cross-sectional area fraction of total fibers in the film within the peak regions is less than about 5%. In one embodiment, the film has a first porosity in the valley regions and a second porosity in the peak regions, where the first porosity is greater than the second porosity.

The application also relates to a process for forming a nonwoven composite. The process includes forming a lofty nonwoven layer containing a plurality of primary fibers and having a first side and an opposite second side, the first side and the second side further defining a nonwoven layer thickness. The process includes obtaining a thermoplastic polymer and applying the thermoplastic polymer to the second side of the nonwoven layer, where the thermoplastic polymer is in the form of a molten polymer, semi-molten polymer, or solid film. Next, pressure and optionally heat is applied to the nonwoven layer and thermoplastic polymer, where the thermoplastic polymer and the second side of the nonwoven layer are subjected to a textured surface forming a plurality of peak regions and a plurality of valley regions in the second side of the nonwoven layer and encapsulating a portion of the fibers from the nonwoven layer into the thermoplastic polymer within the valley regions. The cross-sectional area fraction of total fibers in the film within the valley regions is at least about 8% and the cross-sectional area fraction of total fibers in the film within the peak regions is less than about 5%. The thermoplastic polymer is cooled forming a thermoplastic film and the nonwoven layer which together form the nonwoven composite. In one embodiment, the composite is subjected to additional heat and optionally pressure such that a plurality of pores form in the thermoplastic film within the valley regions. This causes the thermoplastic film to have a first porosity in the valley regions and a second porosity in the peak regions, where the first porosity is greater than the second porosity.

BRIEF DESCRIPTION OF THE DRAWINGS

FIG. 1 illustrates a cross-section of one embodiment of the nonwoven composite.

FIG. 2 is a micrograph of the cross-section of one embodiment of the nonwoven composite.

FIG. 3 illustrates a cross-section of one embodiment of the nonwoven composite after an additional heat cycle.

FIG. 4A is a top-view micrograph of one embodiment of the nonwoven composite. FIG. 4B is a top-view micrograph of one embodiment of the nonwoven composite after an additional heat cycle.

FIG. 5 is a micrograph of the cross-section of one embodiment of the nonwoven composite after an additional heat cycle.

DETAILED DESCRIPTION

The present disclosure is directed to moldable acoustic composites that provide acoustical properties including, but not limited to, sound absorption properties and sound barrier properties. The acoustic composite (and the acoustically coupled nonwoven composites within the acoustic composite) have exceptional sound absorption properties; (2) have structural features that enable their use in a variety of applications; and (3) can be manufactured in a cost-effective manner.

Referring to FIG. 1, there is shown a cross-sectional illustration of one embodiment of the nonwoven composite 10. The nonwoven composite 10 contains two main elements, a lofty nonwoven layer 100 and a thermoplastic film 200. The nonwoven composite has an upper surface 10a and a lower surface 10b. The distance between these two surfaces is the nonwoven composite thickness.

The lofty nonwoven layer has a first side 100a and a second side 100b. The distance between the first side 100a and the second side 100b is defined as the nonwoven layer thickness. Typically, the first side 100a of the nonwoven layer 100 forms the upper surface 10a of the composite 10. In one embodiment, the first side 100a of the nonwoven layer 100 forms the "A" layer surface, meaning the outermost exposed and visible surface.

The lofty nonwoven layer 100 may be formed by any suitable method including, but not limited to carding or garneting, air laying, cross-lapping, needling, structuring, stitching, and bonding. The nonwoven layer 100 contains a plurality of primary fibers as well as optional fibers such as binder fibers and other effect fibers.

Preferably, the lofty nonwoven layer 100 is formed by carding, cross-lapping, and needle-punching, and optionally thermal bonding a plurality of primary fibers and optional binder fibers. The nonwoven layer preferably has a thickness between about 1 and 25 mm and more preferably a thickness between about 1 and 8 mm. The nonwoven layer preferably has an areal density of between about 100 and 2000 g/m² and more preferably between about 250 and 800 g/m². In one embodiment, the nonwoven layer is substantially and generally uniform in fiber weight percentages, areal weights, and areal densities across the nonwoven layer. In one embodiment, the primary fibers are in an amount greater than about 50% by weight of the nonwoven layer 100, preferably between about 60 and 100% by weight of the nonwoven layer, and more preferably between about 70 and 95% by weight of the nonwoven layer.

The primary fibers of the lofty nonwoven layer 100 are fibers that provide mass and volume to the material. The primary fibers provide volume or bulk or loft in the Z-direction. For the purposes of this application, the Z-direction of the nonwoven is defined as the direction orthogonal to the planar direction of the nonwoven layer. The planar direction means in a plane parallel to the first and second sides of the nonwoven layer. The primary fibers are preferably staple fibers. Primary fibers can include virgin and recycled fibers, high crimp fibers, hollow-fill fibers, non-circular cross-section fibers and other common staple fibers. Some examples of primary fibers include polyester, polypropylene, nylon, cotton, and wool as well as other staple fibers. In a preferred embodiment, the primary fibers comprise polyester. Preferably, the primary fibers have a denier of approximately 1 to 20, more preferably 1.5 to 12 denier, and most preferably 3 to 9 denier. In one embodiment, the fibers have a circular cross section. In another embodiment, fibers have higher surface area or noncircular cross section such as segmented pie, 4DG, winged fibers, tri-lobal etc. It has been shown that the fiber denier, crimp, and cross-section have an effect on the sound absorption properties of the nonwoven.

In addition to the primary fibers 110 in the lofty nonwoven layer 100, the optional binder fibers of the lofty nonwoven layer 100 are fibers that adhere to and bond with the other fibers. Binder fibers can include fibers that are heat activated. Examples of heat activated binder fibers are fibers that can melt at lower temperatures, such as low melt fibers, bi-component fibers, such as side-by-side or core and sheath fibers with a lower sheath melting temperature, and the like. In one embodiment, the binder fibers are a polyester core and sheath fiber with a lower melt temperature sheath. A benefit of using a heat activated binder fiber as the binder fiber in the lofty nonwoven layer 100, is that the layer can be subsequently molded to part shapes for use in automotive floors, wheel well liners, underbody shields, hood liners, engine compartment covers, ceiling tiles, office panels, etc. Another benefit of binder fibers in the lofty nonwoven layer when the first side 100*a* is an exposed "A" surface is to increase the abrasion resistance of the exposed nonwoven layer. The binder fibers are preferably staple fibers. Preferably, when the nonwoven composite 10 is subjected to an additional heat cycle and then cooled forming the composite 20, the binder fibers remain as discernable fibers. In another embodiment, when the nonwoven composite 10 is consolidated, the binder fibers lose their fiber shape and form a coating on surrounding materials. When activated by heat or other means, the binder fibers create fused bond points or welds between adjacent fibers that create a network of interconnected fibers. Preferably, the optional binder fibers have a denier less than or about equal to 15 denier, more preferably less than about 6 denier, and most preferably 4 denier or less.

In one embodiment, the first side 100*a* of the lofty nonwoven layer 100 is formed into a random velour. To create the random velour, the lofty nonwoven layer is passed over a brush apparatus having a series of projections and interstices between the projections. The lofty nonwoven layer is then needled from the second side 100*b* of the lofty nonwoven layer into the brush apparatus such that a portion of the primary fibers are pushed into the interstices of the brush apparatus and out of and away from the first side 100*a* side of the lofty nonwoven layer. This creates a loop-like and velour-like surface on the first side 100*a* of the lofty nonwoven layer 100. This random velour look is desirable as when used as an "A" surface (the surface of the composite accessible in the final application) for end uses such as car interiors. Preferably, the random velour has a pile height of at least about 2 millimeters.

Any other suitable fiber may also be used in the lofty nonwoven layer 100 in addition to the primary fibers 110 and optional binder fibers described previously. These may include, but are not limited to, an additional binder fiber having a different denier, staple length, crimp, cross-sectional shape, composition, or melting point or a bulking fiber having a different denier, staple length, or composition, or a fire resistant or fire retardant fiber. The fiber may also be an effect fiber, providing a desired aesthetic or function. These effect fibers may be used to impart color, chemical resistance (such as polyphenylene sulfide fibers and polytetrafluoroethylene fibers), moisture resistance (such as polytetrafluoroethylene fibers and topically treated polymer fibers), heat resistance (such as glass or ceramic fibers), fire resistance, or others.

In one embodiment, the nonwoven layer 100 contains fire resistant fibers. These fire resistant fibers may also act as the bulking fibers or may be used in addition to the bulking fibers. As used herein, fire retardant fibers shall mean fibers having a Limiting Oxygen Index (LOI) value of 20.95 or greater, as determined by ISO 4589-1. Types of fire retardant fibers include, but are not limited to, fire suppressant fibers and combustion resistant fibers. Fire suppressant fibers are fibers that meet the LOI by consuming in a manner that tends to suppress the heat source. In one method of suppressing a fire, the fire suppressant fiber emits a gaseous product during consumption, such as a halogenated gas. Examples of fiber suppressant fibers include modacrylic, PVC, fibers with a halogenated topical treatment, and the like. Combustion resistant fibers are fibers that meet the LOI by resisting consumption when exposed to heat. Examples of combustion resistant fibers include silica impregnated rayon such as rayon sold under the mark VISIL®, partially oxidized polyacrylonitrile, polyaramid, para-aramid, carbon, meta-aramid, melamine and the like.

Some or all of the fibers (primary 110, optional binder, additional fibers) may additionally contain additives. Suitable additives include, but are not limited to, fillers, stabilizers, plasticizers, tackifiers, flow control agents, cure rate retarders, adhesion promoters (for example, silanes and titanates), adjuvants, impact modifiers, expandable microspheres, thermally conductive particles, electrically conductive particles, silica, glass, clay, talc, pigments, colorants, glass beads or bubbles, antioxidants, optical brighteners, antimicrobial agents, surfactants, fire retardants, and fluoropolymers. One or more of the above-described additives may be used to reduce the weight and/or cost of the resulting fiber and layer, adjust viscosity, or modify the thermal properties of the fiber or confer a range of physical properties derived from the physical property activity of the additive including electrical, optical, density-related, liquid barrier or adhesive tack related properties.

The network of fibers in the lofty nonwoven layer interact through entanglement and bonding to provide integrity, strength, and resiliency when the lofty nonwoven is exposed to forces. In the planar direction of the lofty nonwoven, the degree of entanglement and bonding can be measured by the tensile properties of the nonwoven layer.

Another characteristic of the lofty nonwoven layer is the tendency for the material to deform in the Z-direction when a compression force is applied and recover its original shape after the compression force is removed. Preferably, the volumetric porosity of the lofty nonwoven layer is greater than about 50%, more preferably greater than about 80%. These levels of porosity in lofty nonwovens will enable Z-direction compression and recovery properties well suited for many applications such as floor underlayment, carpet padding, and furnishings. Different lofty nonwoven layers with different combinations of non-uniform fiber orientations, fiber contact points, discrete bond points, and bulk densities results in materials that exhibit different levels of compression and recovery behavior when exposed to Z-direction compression forces. For example, a loosely connected network of low stiffness or small diameter fiber may have a very low compression resistance and compression recovery while a more densely connected network of stiff fibers may offer higher compression resistance and recovery. These compression and recovery properties may play a critical role in how the material behaves when exposed to further processing steps such as coating, lamination, heating and molding.

The lofty nonwoven layer may also be formed with a non-uniform distribution of fiber types through the lofty nonwoven layer thickness. One embodiment is a stratified lofty nonwoven layer with one side containing primarily large denier fibers and a second side containing primarily small denier fibers. Another embodiment is a structured nonwoven with a first face side and a second back side. In this embodiment the face side is characterized by loops or fiber tufts wherein the fiber axis is generally oriented about in the Z-direction while the back side contains similar or dissimilar fibers where the general orientation is about in the planar direction of the nonwoven layer. An example of one such embodiment would be the nonwoven carpets commonly used in automotive floors which often comprise a face and a back side.

After the lofty nonwoven layer 100 is formed, a thermoplastic is obtained that will be used to form the film 200. The film 200 may be any suitable thermoplastic film that contains a thermoplastic polymer. A suitable polymer is one that has a softening point or melting point near or sufficiently below the melting or softening point of the polymer used to make the primary fibers in the lofty nonwoven layer so that the primary fibers in the lofty nonwoven do not melt or shrink excessively when the thermoplastic polymer is applied to it through heat and/or pressure or when the part is optionally heated to soften the thermoplastic layer as often occurs when molding the nonwoven composite. In one embodiment, for a lofty nonwoven of predominately polyethylene terephthalate (polyester or (PET)) fibers, low density polyethylene or LDPE is a suitable choice of thermoplastic polymer for the film 200. The thermoplastic polymer can include but is not limited to polyethylene, polypropylene, polybutylene, polyvinyl chloride, poly (ethylene-co-vinyl acetate), nylon, polyethylene terephthalate, polybutylene terephthalate. Also suitable for the thermoplastic polymer would be the general class of thermoplastic elastomers, thermoplastic vulcanizates, thermoplastic polyurethane, and copolymers or blends of any thermoplastic polymer(s) with processing aids, viscosity modifiers, fillers, density modifying agents, blowing agents, IR active materials, adhesion modifiers, stabilizers or other additives.

To form the nonwoven composite (10), the thermoplastic polymer is applied to the second side 100b of the nonwoven layer 100 in the form of a molten polymer, semi-molten polymer, or solid film. Pressure (and optionally heat) is applied to the nonwoven substrate and thermoplastic polymer and the thermoplastic polymer and the second side 100b of the nonwoven layer 100 are subjected to a textured surface that in one embodiment form a plurality of peak regions 13 and a plurality of valley regions 11 in the second side 100b of the nonwoven layer 100. The high points of the textured surface correspond to the valley regions in the nonwoven composite, while the low points of the textured surface correspond to the peak regions of the nonwoven composite. Therefore, the textured surface has an inverse profile from the desired texture of the nonwoven layer. Application of the pressure and optionally heat occurs as the thermoplastic polymer is being applied to the nonwoven layer 100 or after the thermoplastic polymer is applied. The thermoplastic film 200 and nonwoven layer 100 are then cooled such that the thermoplastic film has at least partially solidified. This cooling preferably happens while the film is in contact with the textured surface as to preserve the texture in the composite 10. In one embodiment, the application of thermoplastic polymer and subjecting the film and nonwoven layers to pressure (and optionally heat) takes place approximately simultaneously. In another embodiment, the application of thermoplastic polymer and subjecting the film and nonwoven layers to pressure (and optionally heat), and then cooling the film takes place approximately simultaneously.

One preferred method of applying the thermoplastic to the nonwoven layer and subjecting the combination to the textured surface is by bringing the nonwoven layer 100 into a nip (which would contain a patterned roller having a textured surface and a pressure roller) and extruding molten thermoplastic polymer either onto the nonwoven layer before it enters the nip, onto the nonwoven layer right at the nip, or onto the textured roller close to the nip. The patterned roller would have a texture of a plurality of valley regions and a plurality of peak regions (the inverse of the desired pattern on the composite). Typically, the textured roller would be chilled (by cooling water or the like) such that the thermoplastic polymer at least partially solidifies into the negative of the textured surface of the roller before the now coated nonwoven layer leaves the nip.

In another embodiment, the thermoplastic is applied to the nonwoven as a free standing, solid film. This film may be placed on the nonwoven layer and then heat and pressure are applied via a textured surface such that the film is at least partially melted and conforms to the textured surface. The composite is then cooled preferably while the film is in contact with the textured surface as to preserve the texture in the composite 10.

The step of using pressure (and optionally heat) while being subjected to the textured surface creates the plurality of peak regions 13 and plurality of valley regions 11 in the composite 10. The peak regions 13 are identified by the planar portions of the composite surface 10b corresponding to the areas of maximum nonwoven composite thickness. The valley regions are identified by the planar portions of the composite surface 10b where the nonwoven composite thickness is reduced. The measured difference in nonwoven composite thickness between the peak and valley regions is referred to as the indentation depth. The maximum indentation depth measured in the valley region is greater than the average film thickness measured in the peak region. Preferably, the maximum indentation depth is greater than 3 times the film thickness.

Being subjected to the textured surface under pressure (and optionally heat) causes a majority of the film within the valley regions 11 to infuse into the lofty nonwoven layer 100 and therefore a portion of the fibers 110 become embedded and encapsulated in the film. If a fiber cross section is fully surrounded by film it is considered encapsulated. For a given cross section of the composite, preferably greater than about 8% of the cross sectional area of the film in the valley region is occupied by encapsulated fibers of the lofty nonwoven (these fibers include all of the fibers of the nonwoven layer including primary fibers and any other fibers included in the nonwoven layer), preferably greater than about 10%, more preferably greater than about 15%, more preferably greater than about 20%.

Preferably, the peak regions comprise essentially no encapsulated fibers (these fibers include all of the fibers of the nonwoven layer including primary fibers and any other fibers included in the nonwoven layer) from the lofty nonwoven. "Essentially no encapsulated fibers" in this application is defined to mean less than 5% of the cross sectional area of the film contains encapsulated fibers. This encapsulation of fibers in the valley regions and not in the peak regions can be seen, for example, in the micrograph of FIG. 2.

In FIG. 2, the area fraction of total fibers in the thermoplastic film (200) within the valley region is shown to be approximately 25% (25% equals 0.25 as a fraction). The area within the lofty nonwoven layer near the second side of the nonwoven layer in the valley region is shown to be locally compressed (distance between fibers is less) relative to the area within the lofty nonwoven layer in the peak region near the second side of the lofty nonwoven layer. When compressed in thickness, lofty nonwoven layers will typically exert a restoring force which acts to restore the material thickness. In the example shown, the local compression of the lofty nonwoven layer is maintained by the presence of the infused and solidified film. This local compression within the lofty nonwoven layer implies there are residual stresses within the lofty nonwoven layer.

In one embodiment, the angle formed from the plane of the textured roller and the tangent to the projection from the plane of the belt that constitutes the pattern should preferable be between 90° and 120°. The percentage of the valley and peak areas can be used to tailor the overall porosity of the resultant composite.

Preferably, the plurality of valley regions 11 and plurality of peak regions 13 are in a pattern. The pattern may be continuous or discontinuous, regular and repeating or random. "Continuous" in this application means that from one edge of the composite to the other edge there is a continuous path of either peaks or valleys. Some continuous patterns include linear stripes, grids, a rectilinear grid, and wavy lines. "Discontinuous" in this application means that from one edge of the composite to the other edge there is not a path of either peaks or valleys. Examples of discontinuous patterns include dots, most indicia, text, and short random lines. Preferably, the presence of the peak regions and valley regions on the lower surface 10b of the composite 10 is not visibly evident when looking at the upper surface 10a of the composite 10.

In one embodiment, the second side of the nonwoven layer preferably contains a plurality of wall regions located between the valley regions and peak regions. Between the peak regions 13 and the valley regions 11 will typically be a wall region which is a transitional region between the peaks and the valleys. The wall region may contain physical characteristics of both the peak and valley regions. The maximum slope or angle of the walls should be at least about 20 degrees, preferably greater than about 30 degrees, and more preferably greater than about 45 degrees relative to the plane of the lower surface of the nonwoven composite.

The valley region of the film can range from about 5% to 80% of the total area of the lower surface 10b of the composite 10, preferably between about 20% and 60%. In a preferred embodiment, the valleys are at least three times as wide as the average film thickness. In another embodiment, the valleys are at least as wide as half the lofty nonwoven 100 thickness. In another embodiment, the valleys are at least three times as wide as the average spacing between fibers on the second side 100b of the nonwoven 100. Preferably, the valleys are narrower than three times the lofty nonwoven thickness, more preferably narrower than the lofty nonwoven thickness.

Once the nonwoven composite is formed, it may be treated to an additional step of adding heat and optionally pressure. During this second treatment, the thermoplastic film 200 softens or melts. The addition of heat and optionally pressure along with the softening of the thermoplastic film enables the compressed areas of the nonwoven layer to relax and spring back. The forces that drive the relaxation and spring back behavior of the nonwoven layer include residual mechanical stresses, residual thermal stresses, and polymer shrinkage. The relative motion among the fibers in the nonwoven layer as it relaxes and springs back exert a shearing action on the thermoplastic film locally between and among the encapsulated fibers in the valley region of the nonwoven composite. In some areas of the valley regions, the shearing action exerted on the thermoplastic film by the encapsulated fibers is sufficient to tear the film and open up pores through the thickness of the thermoplastic film.

The concentration of encapsulated fibers in the valley regions driven by the higher localized pressures of the textured surface leads to higher degrees of relative motion of encapsulated fibers in and around the valley regions of the nonwoven composite when exposed to the second treatment. By controlling the pattern type, pattern feature sizes, film thickness, and compression properties of the nonwoven layer, the overall degree of porosity created in the valley region can be controlled. As the peak regions preferably have essentially no encapsulated fibers, there are few to no holes or pores formed in the peak regions. After heating, in the peak regions, the film and the nonwoven layer are preferably still two separate and distinct layers where the interface where the two layers meet being readily visible. After this additional heating step, the plurality of valley regions has a first porosity and the plurality of peak regions has a second porosity, where the first porosity is greater than the second porosity.

FIG. 3 illustrates a cross-section showing the pores 120 that are formed in the composite when subjected to an additional heating cycle. FIGS. 4A and 4B are photo micrographs of the bottom surface of the composite in a valley region. FIG. 4A shows the fibers encapsulated with the film with essentially no holes or pores after the composite has been formed. FIG. 4B shows the fibers encapsulated within the film with a plurality holes or pores after the composite has been subjected to the additional heat cycle. FIG. 5 shows a micrograph of a cross-section in a valley region after the composite has been subjected to the additional heat cycle, where pores have formed in the film. Note that polymer tends to bridge the gaps between fibers, creating pores that are smaller than the original windows in the nonwoven fiber bed.

The pores 120 formed after the composite 10 is heated to form composite 20 are typically smaller than 0.5 mm along their largest dimension, more preferably smaller than 0.2 mm. In one embodiment, the number average pore size is under 0.06 mm and half of the pore area is provided by pores with less than 0.120 mm diameter. The average pore size is related to the average distance between fibers in the lofty nonwoven and the degree of relative motion that occurs between encapsulated fibers during the second heating step. Pores 120 with dimensions on this scale are known to provide excellent sound absorption due to their ability to dissipate sound energy in a viscous boundary layer as the sound pressure waves move air through the pores. Pores of these dimensions can be difficult to form through common means such as mechanical perforation.

A patterned surface of peaks and valleys wherein the valley regions have greater porosity than the peak regions has numerous benefits. The solid film nature of the peak regions provides an accessible area for bonding of additional layers to the composite without disturbing the porosity created in the valley regions of the composite and the film of the peak regions, when heated, can act as the adhesive material. In terms of acoustic performance, the peak regions act primarily as barrier regions while the valley regions are highly sound absorbing. The combination of peaks and valleys enables a more drapable composite that can be molded with fewer wrinkles.

In one embodiment, during this additional heating (with optional pressure step), the composite 10 is molded into a three-dimensional shape. Once cooled, the composite will typically retain its molded shape and be stiff enough not to collapse under its own weight. The molded composite can be used for any suitable application such as molded acoustic parts for automotive applications.

In one embodiment, a porous absorbing nonwoven layer is attached to the composite (preferably on the lower surface of the composite 10. This porous absorbing nonwoven layer has a thickness greater than the thickness of the nonwoven layer 100. This porous absorbing nonwoven layer is sometimes referred to in the automotive industry as a sound absorbing or shoddy layer. The shoddy layer can be added to a composite to provide additional acoustic absorption, barrier properties, or vibrational damping properties to the total system, leading to better overall performance. The porous absorbing nonwoven layer can be attached by any suitable means such as adhesive or fasteners. In a different embodiment, the shoddy can serve as the lofty nonwoven layer 100.

The nonwoven composite 10 may also contain any additional layers for physical or aesthetic purposes. Suitable additional layers include, but are not limited to, a nonwoven fabric, a woven fabric, a knitted fabric, a foam layer, a film, a paper layer, an adhesive-backed layer, a foil, a mesh, an elastic fabric (i.e., any of the above-described woven, knitted or nonwoven fabrics having elastic properties), an apertured web, an adhesive-backed layer, or any combination thereof. Other suitable additional layers include, but are not limited to, a color-containing layer (e.g., a print layer); one or more additional sub-micron fiber layers having a distinct average fiber diameter and/or physical composition; one or more secondary fine fiber layers for additional insulation or acoustic performance (such as a melt-blown web or a fiberglass fabric); foams; layers of particles; foil layers; films; decorative fabric layers; membranes (i.e., films with controlled permeability, such as dialysis membranes, reverse osmosis membranes, etc.); netting; mesh; wiring and tubing networks (i.e., layers of wires for conveying electricity or groups of tubes/pipes for conveying various fluids, such as wiring networks for heating blankets, and tubing networks for coolant flow through cooling blankets); or a combination thereof. The additional layers may be on either or both sides of the nonwoven composite. For example, a textile may be applied to one side of the nonwoven composite using an optional adhesive layer to form an aesthetic surface for an end use such as certain automobile applications.

The nonwoven composite 10 may further comprise one or more attachment devices to enable the composite 10 to be attached to a substrate or other surface. In addition to adhesives, other attachment devices may be used such as mechanical fasteners like screws, nails, clips, staples, stitching, thread, hook and loop materials, etc.

The one or more attachment devices may be used to attach the composite 10 to a variety of substrates. Exemplary substrates include, but are not limited to, a vehicle component; an interior of a vehicle (i.e., the passenger compartment, the motor compartment, the trunk, etc.); a wall of a building (i.e., interior wall surface or exterior wall surface); a ceiling of a building (i.e., interior ceiling surface or exterior ceiling surface); a building material for forming a wall or ceiling of a building (e.g., a ceiling tile, wood component, gypsum board, etc.); a room partition; a metal sheet; a glass substrate; a door; a window; a machinery component; an appliance component (i.e., interior appliance surface or exterior appliance surface); a surface of a pipe or hose; a computer or electronic component; a sound recording or reproduction device; a housing or case for an appliance, computer, etc.

EXAMPLES

Example 1

The lofty nonwoven of Example 1 was formed from the following fibers:
- 95% by weight 9 denier PET fibers with an average staple length of 76 mm
- 5% by weight 4 denier bicomponent PET binder fibers with an average staple length of 51 mm (acted as a binder fiber)

The fibers were formed into the lofty nonwoven by a typical carding, crosslapping, and needlepunching operation and then subjected to a random velour operation to structure the fibers. The weight of the lofty nonwoven was 560 g/m$^2$.

The second side of the lofty nonwoven was coated with 100 g/m$^2$ of 12 melt flow rate (MFR) low density polyethylene (LDPE) using a standard extrusion lamination process.

The lofty nonwoven was roll fed into a nip formed by a textured chill roller and a pressure roller such that the second side of the nonwoven faced the textured chill roller and the first side faced the pressure roller. The molten LDPE was applied to the second side of the nonwoven at the nip.

The textured chill roll texture was formed by cloaking a stainless steel chill roll with a woven fiberglass belt coated with Teflon. The belt exhibited a 5-mm square grid using approximately 840-micron diameter yarns. The yarns of the grid formed approximately 31% of the surface area on the roller, with the remaining 69% being open.

An inverse texture of the chill roll was imparted to the second side of the nonwoven of Example 1, where the yarn area of the textured chill roll approximately corresponded to the valley regions in the nonwoven composite and the open area of the belt approximately corresponded to the peak areas of the nonwoven composite. In the peak regions, the film had an average thickness of 0.1 mm and had essentially no fibers encapsulated in it. In the valley regions, the film was embedded into the lofty nonwoven to a depth equivalent to at least three fiber diameters and the lofty nonwoven exhibited an indentation depth of about 0.47 mm.

Example 2

The nonwoven composite of Example 1 was heated by an infrared heater to a surface temperature of approximately 350° F. while constrained by a frame around all 4 sides, then cooled to near room temperature before removing from the frame. After the heating and cooling, the nonwoven composite exhibited a plurality of micropores, where the areal porosity (percent of the film area open to the nonwoven substrate below) in the valleys was greater than 7% and the porosity in the peak regions was essentially zero, meaning no pores were found in the peak regions over the area surveyed.

After heating, the peak regions look substantially unchanged from the unheated Example 1, that is, there were essentially no encapsulated fibers in the film and there are still two separate and distinct layers where the interface where the two layers meet being readily visible. The average film thickness in the peak region remained 0.1 mm. The valley regions of Example 2 exhibit an indentation depth of about 0.100-0.150 mm resulting from the decompression of the fibers in the valley region upon heating. The cross-sectional area fraction of total fibers in the film within the valley regions was greater than 15%.

Example 3

The lofty nonwoven of Example 3 was formed from the following combination of fibers:
  92% by weight 6 denier PET fibers with an average staple length of 76 mm
  8% by weight 4 denier bicomponent PET binder fibers with an average staple length of 51 mm The fibers were formed into the lofty nonwoven by a typical carding, crosslapping, and needlepunching operation and then subjected to a random velour operation to structure the fibers. The weight of the lofty nonwoven was 350 g/m².

The second side of the lofty nonwoven was coated with 100 g/m² of 12 MFR LDPE using a standard extrusion lamination process.

The loft nonwoven was roll feed into a nip formed by a textured chill roller and a pressure roller such that the second side of the nonwoven was facing the textured chill roller and the first side was facing the pressure roller. The molten LDPE was applied to the second side of the nonwoven at the nip.

The textured chill roll texture was formed by cloaking a stainless steel chill roll with a woven fiberglass belt coated with Teflon. The belt exhibited a 5-mm square grid using approximately 840-micron diameter yarns. The yarns of the grid formed approximately 31% of the surface area on the roller, with the remaining 69% being open.

An inverse texture of the chill roll was imparted to the second side of the nonwoven. Where the yarn area of the textured chill roll approximately corresponded to the valley regions in the nonwoven composite and the open area of the belt approximately corresponded to the peak areas of the nonwoven composite. In the peak regions, the film had an average thickness of 0.1 mm and had essentially no fibers encapsulated in it. In the valley regions, the film was embedded into the lofty nonwoven to a depth equivalent to at least three fiber diameters and the lofty nonwoven exhibited an indentation depth of about 0.47 mm.

Example 4

The nonwoven composite of Example 3 was heated in an oven set to 374° F. on a pin frame, removed from the oven, and cooled to room temperature. After the heating for 1 min, 2 min, or 4 min, and then cooling to room temperature, the peak regions look substantially unchanged from the unheated Example 3, that is, there were essentially no encapsulated fibers in the film and there are still two separate and distinct layers where the interface where the two layers meet being readily visible. The average film thickness in the peak region remained 0.1 mm after heating. The nonwoven composite exhibited a plurality micropores, where the porosity in the valley regions was greater than the porosity in the peak regions and the porosity in the peak regions of the nonwoven composite was essentially zero, meaning no pores were found in the peak regions over the area surveyed. The valley regions of Example 2 exhibited a reduced indentation depth relative to the unheated Example 3.

Example 5

The lofty nonwoven of Example 5 was formed from the following fibers:
  95% by weight 9 denier PET fibers with an average staple length of 76 mm
  5% by weight 4 denier bicomponent PET binder fibers with an average staple length of 51 mm The fibers were formed into the lofty nonwoven by a typical carding, crosslapping, and needlepunching operation and then was subjected to a random velour operation to structure the fibers. The weight of the lofty nonwoven was 560 g/m².

The second side of the lofty nonwoven was coated with 100 g/m² of 12 MFR LDPE using a standard extrusion lamination process.

The loft nonwoven was roll feed into a nip formed by a textured chill roller and a pressure roller such that the second side of the nonwoven was facing the textured chill roller and the first side was facing the pressure roller. The molten LDPE was applied to the second side of the nonwoven at the nip.

The chill roll texture was achieved by cloaking a stainless steel chill roll with textured rubber mat. The textured rubber mat exhibited a pattern of mutually parallel protrusions running parallel to the direction of travel of the nonwoven layer through the extrusion range. In the cross section, the shape of the protrusions was an equilateral triangle with a rounded tip. The spacing between the triangular protrusions was 1 mm and the stripes were 2.2 mm at the base yielding a center to center distance between the triangular shaped protrusions of 3.2 mm. The protrusions projected outward from the plane of the mat to a height of 1.4 mm. An inverse texture of the textured rubber mat was imparted to the second side of the nonwoven composite. This resulted in the valley regions in the nonwoven composite corresponding in location and shape to the tip of the equilateral triangle protrusions.

Example 6

The nonwoven composite of Example 5 was heated by an infrared heater to a surface temperature of approximately 350° F. while clamped in a frame, then cooled to room temperature. After the heating and cooling, the nonwoven composite exhibited a plurality micropores, where the porosity in the valleys was greater than the porosity in the peak regions of the nonwoven composite, and the porosity in the peak regions was essentially zero, meaning no pores were found in the peak regions over the area surveyed.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A nonwoven composite having an upper surface and a lower surface, the upper surface and the lower surface further defining a composite thickness, wherein the nonwoven composite comprises:
   (a) a lofty nonwoven layer comprising a plurality of primary fibers and having a first side and an opposite second side, the second side defining a plurality of peak regions and a plurality of valley regions, the first side and the second side further defining a nonwoven layer thickness, wherein the first side of the nonwoven layer forms the upper surface of the nonwoven composite; and
   (b) a film comprising a thermoplastic polymer, the film being present on at least a majority of the second side of the nonwoven layer and having a film thickness in the peak regions of the layer, wherein the film has a first porosity in the valley regions and a second porosity in the peak regions, wherein the first porosity is greater than the second porosity, wherein within the valley regions the film comprises a plurality of encapsulated fibers from the nonwoven layer, and wherein the cross-sectional area fraction of total fibers in the film within the valley regions is at least about 8% and the cross-sectional area fraction of total fibers in the film within the peak regions is less than about 5%,
   wherein the composite thickness is greatest in the peak regions in the lofty nonwoven layer and wherein the composite thickness is reduced in the valley regions in the lofty nonwoven layer.

2. The nonwoven composite of claim 1, wherein the peak regions and valley regions are present as a rectilinear grid.

3. The nonwoven composite of claim 1, wherein the peak regions and valley regions are present as linear stripes.

4. The nonwoven composite of claim 1, wherein the second side of the nonwoven layer further comprises a plurality of wall regions located between the peak regions and valley regions.

5. The nonwoven composite of claim 4, wherein the angle of the walls regions is greater than about 30 degrees relative to the plane of the lower surface of the nonwoven composite.

6. The nonwoven composite of claim 1, wherein the film in the peak regions comprises essentially no pores.

7. The nonwoven composite of claim 1, wherein the film in the peak regions comprises essentially no encapsulated primary fibers from the nonwoven layer.

8. The nonwoven composite of claim 1, wherein the first porosity is at least 1000% greater than the second porosity.

9. The nonwoven composite of claim 1, wherein the peak regions comprise between about 40 and 80% of the surface area of the second surface of the nonwoven layer.

10. The nonwoven composite of claim 1, wherein the valley regions comprise between about 20 and 60% of the surface area of the second surface of the nonwoven layer.

11. The nonwoven composite of claim 1, wherein the first surface of the nonwoven layer comprises a false velour.

12. The nonwoven composite of claim 1, wherein the average composite thickness at the peak regions minus the average composite thickness at the valley regions is greater than the average peak film thickness.

13. A nonwoven composite comprising:
   (a) a lofty nonwoven layer comprising a plurality of primary fibers and having a first side and an opposite second side, the second side defining a plurality of peak regions and a plurality of valley regions, the first side and the second side further defining a nonwoven layer thickness; and
   (b) a film comprising a thermoplastic polymer and having a film thickness in the peak regions of the layer, the film being present on at least a majority of the second surface of the nonwoven layer, wherein within the valley regions the film comprises a plurality of encapsulated fibers from the nonwoven layer, and wherein the cross-sectional area fraction of total fibers in the film within the valley regions is at least about 8% and the cross-sectional area fraction of total fibers in the film within the peak regions is less than about 5%,
   wherein the composite thickness is greatest in the peak regions in the lofty nonwoven layer and wherein the composite thickness is reduced in the valley regions in the lofty nonwoven layer.

14. The nonwoven composite of claim 13, wherein the peak regions and valley regions are present as a rectilinear grid.

15. The nonwoven composite of claim 13, wherein film thickness is between about 0.04 and 0.3 mm.

16. The nonwoven composite of claim 13, wherein the film in the peak regions comprises essentially no encapsulated primary fibers from the nonwoven layer.

17. The nonwoven composite of claim 13, wherein the peak regions comprise between about 20 and 95% of the surface area of the second surface of the nonwoven layer.

18. The nonwoven composite of claim 13, wherein the valley regions comprise between about 5 and 60% of the surface area of the second surface of the nonwoven layer.

19. The nonwoven composite of claim 13, wherein the first surface of the nonwoven layer comprises a false velour.

20. The nonwoven composite of claim 13, wherein the average composite thickness at the peak regions minus the average composite thickness at the valley regions is greater than the average peak film thickness.

21. A nonwoven composite having an upper surface and a lower surface, the upper surface and the lower surface further defining a composite thickness, wherein the nonwoven composite comprises:
  (a) a lofty nonwoven layer comprising a plurality of primary fibers and having a first side and an opposite second side, the second side defining a plurality of peak regions and a plurality of valley regions, the first side and the second side further defining a nonwoven layer thickness, wherein the first side of the nonwoven layer forms the upper surface of the nonwoven composite; and
  (b) a film comprising a thermoplastic polymer, the film being present on at least a majority of the second side of the nonwoven layer and having a film thickness in the peak regions of the layer, wherein the film has a first porosity in the valley regions and a second porosity in the peak regions, wherein the first porosity is greater than the second porosity, wherein within the valley regions the film comprises a plurality of encapsulated fibers from the nonwoven layer, and wherein the cross-sectional area fraction of total fibers in the film within the valley regions is at least about 8% and the cross-sectional area fraction of total fibers in the film within the peak regions is less than about 5%,
  wherein the composite thickness is greatest in the peak regions of the lofty nonwoven layer and wherein the composite thickness is reduced in the valley regions of the lofty nonwoven layer, and wherein the average composite thickness at the peak regions minus the average composite thickness at the valley regions is greater than the average peak film thickness.

22. The nonwoven composite of claim 21, wherein the average composite thickness at the peak regions minus the average composite thickness at the valley regions is greater than three times the average peak film thickness.

23. The nonwoven composite of claim 21, wherein the film in the peak regions comprises essentially no pores.

24. The nonwoven composite of claim 21, wherein the film in the peak regions comprises essentially no encapsulated primary fibers from the nonwoven layer.

25. The nonwoven composite of claim 21, wherein the first porosity is at least 1000% greater than the second porosity.

* * * * *